(12) United States Patent
Lee

(10) Patent No.: US 8,289,397 B2
(45) Date of Patent: Oct. 16, 2012

(54) SYSTEM AND METHOD FOR TESTING A DIGITAL CAMERA MODULE

(75) Inventor: Chun-Yi Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 427 days.

(21) Appl. No.: 12/701,724

(22) Filed: Feb. 8, 2010

(65) Prior Publication Data

US 2011/0074961 A1    Mar. 31, 2011

(30) Foreign Application Priority Data

Sep. 29, 2009   (CN) .......................... 2009 1 0307977

(51) Int. Cl.
*H04N 17/02*   (2006.01)
*G06K 9/00*    (2006.01)

(52) U.S. Cl. ....................................... 348/187; 382/170

(58) Field of Classification Search .................. 348/175, 348/180–194; 382/106
See application file for complete search history.

(56) References Cited

U.S. PATENT DOCUMENTS

| 5,793,340 | A  | * | 8/1998  | Morita et al. ...................... 345/7 |
| 2001/0002936 | A1 | * | 6/2001  | Tsuji et al. ..................... 382/170 |
| 2004/0252303 | A1 | * | 12/2004 | Giorgianni et al. ........... 356/402 |
| 2005/0129325 | A1 | * | 6/2005  | Wu ............................... 382/254 |

* cited by examiner

*Primary Examiner* — Jefferey Harold
*Assistant Examiner* — Michael Teitelbaum
(74) *Attorney, Agent, or Firm* — Altis Law Group, Inc.

(57) ABSTRACT

A method for testing a digital camera module reads a digital image from the digital camera module under test, extracts a tricolor coefficient of each pixel of the digital image to form a measurement array, and compares the measurement array with a reference array to find tricolor coefficient differences. The method extracts an edge of the digital image, processes the edge of the digital image using binarization to obtain measurement binary values, and compares the measurement binary values with reference binary values to find binary values differences. The method further compares a count of the tricolor coefficient differences with a first acceptable value, and compares a count of the binary values differences with a second acceptable value to determine quality of the digital camera module.

14 Claims, 5 Drawing Sheets

| Reference array of a standard image | | | |
|---|---|---|---|
| (0.2,0.3,0.5) | (0.1,0.1,0.8) | (0.4,0.5,0.1) | (0.0,0.0,1.0) |
| (0.3,0.4,0.3) | (0.2,0.3,0.5) | (0.2,0.2,0.6) | (0.1,0.8,0.1) |
| (0.2,0.8,0.0) | (1.0,0.0,0.0) | (0.6,0.1,0.3) | (0.8,0.2,0.0) |
| (0.0,1.0,0.0) | (0.9,0.1,0.0) | (0.9,0.0,0.1) | (0.2,0.7,0.1) |

FIG. 3A

| Measurement array of a digital image | | | |
|---|---|---|---|
| (0.2,0.3,0.5) | (0.1,0.1,0.8) | (0.4,0.5,0.1) | (0.0,0.0,1.0) |
| (0.3,0.4,0.3) | (0.1,0.3,0.6) | (0.2,0.2,0.6) | (0.1,0.9,0.0) |
| (0.2,0.8,0.0) | (1.0,0.0,0.0) | (0.7,0.0,0.3) | (0.8,0.2,0.0) |
| (0.0,1.0,0.0) | (0.9,0.1,0.0) | (1.0,0.0,0.0) | (0.2,0.7,0.1) |

| 1 | 0 | 1 | 1 | 1 | 1 | 1 |
|---|---|---|---|---|---|---|
| 1 | | | | | | 1 |
| 1 | | | | | | 1 |
| 1 | | | | | | 1 |
| 1 | 1 | 1 | 1 | 1 | 0 | 1 |

FIG. 4A

| 0 | 0 | 1 | 1 | 0 | 1 | 0 |
|---|---|---|---|---|---|---|
| 1 | | | | | | 0 |
| 0 | | | | | | 1 |
| 1 | | | | | | 1 |
| 0 | 0 | 1 | 0 | 1 | 0 | 1 |

Test report

Serial No. of the digital camera module:
XXXX

Testing date: XX/XX/XXXX

The count of the tricolor coefficient differences: 982

The count of the binary values differences: 300

Test result: bad quality

FIG. 5

SYSTEM AND METHOD FOR TESTING A DIGITAL CAMERA MODULE

BACKGROUND

1. Technical Field

Embodiments of the present disclosure generally relate to electronic device testing, and more particularly, to a system and method for testing a digital camera module of an electronic device.

2. Description of Related Art

Electronic devices such as laptops, digital cameras, and mobile phones come equipped with digital camera modules. Users can check images captured by the digital camera modules using an attached liquid crystal display (LCD) device of the electronic devices. Further, the digital camera modules directly record images thus simplifying the processing and storage of the image.

Advancement in the art meanwhile, has resulted in significantly high-resolution images being capable of maintaining image fidelity. Nevertheless, memory hog is an inconvenience, and so is camera shake during manual operation of the device, particularly as the latter results in blurred images. When displayed on a 1.2 to 3.5 inch LCD devices for example, images may seem sharp. However, when displayed on such larger devices like a CRT monitor or 15 inch or greater LCD, fidelity of the image suffers. Therefore, a system and method addressing the foregoing is desired.

BRIEF DESCRIPTION OF THE DRAWINGS

FIG. 3A exemplifies a reference array and FIG. 3B exemplifies a measurement array.

FIG. 4A exemplifies a reference binary values and FIG. 4B exemplifies measurement binary values.

FIG. 5 illustrates one example of a test report showing a test result of a digital camera module.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
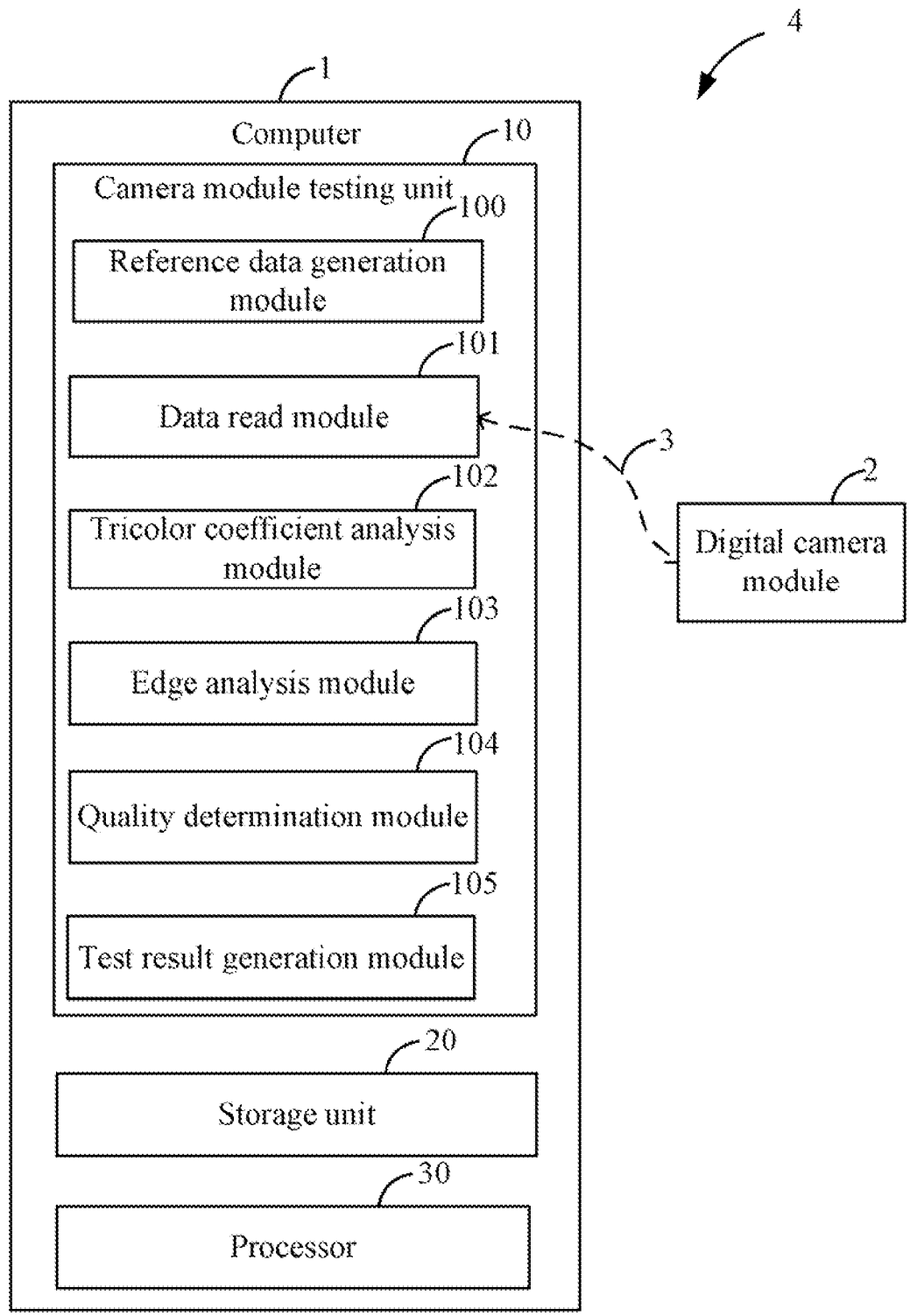
FIG. 1 is a block diagram of one embodiment of a system for testing a digital camera module.

FIG. 1 is a block diagram of one embodiment of a system 4 for testing a digital camera module 2. In one embodiment, the system 4 includes a computer 1 and the digital camera module 2. The computer 1 communicates with the digital camera module 2 via a connection 3. The connection 3 may be wired or wireless. The computer 1 includes a camera module testing unit 10 that includes a plurality of function modules (see below descriptions) which test image fidelity of images captured by the digital camera module 2.

The computer 1 further includes a storage unit 20 that stores one or more computerized codes of the functional modules of the camera module testing unit 10, and a processor 30 that executes the one or more computerized codes of the functional modules of the camera module testing unit 10.

In one embodiment, the camera module testing unit 10 includes a reference data generation module 100, a data read module 101, a tricolor coefficient analysis module 102, an edge analysis module 103, a quality determination module 104, and a test result generation module 105.

The reference data generation module 100 determines a standard image from the storage unit 20. In the present embodiment, the standard image is an image of a preset scene/object captured by a high quality camera module at fixed conditions. The fixed conditions can include a distance between the high quality camera module and the scene/object, angles between the high quality camera module and the scene/object, and lighting conditions, for example. The reference data generation module 100 further extracts a tricolor coefficient of each pixel of the standard image to form a reference array. It may be understood that, the tricolor coefficient is a R, G, B value of a pixel in an image. An example of the reference array is shown in FIG. 3A. The reference data generation module 100 further extracts an edge of the standard image, and processes the edge using binarization to obtain reference binary values. It may be understood that, the binarization is a conversion of a color or grayscale image to a bilevel image consisting of just two colors, namely black and white. An example of the reference binary values is shown in FIG. 4A, where the binary 1 may represent the color black, and the binary 0 may represent the color white.

The data read module 101 reads a digital image from the digital camera module 2. In the present embodiment, the digital image is of the same scene as the standard image, and is captured by the digital camera module 2 at the same fixed conditions as the standard image was captured.

The tricolor coefficient analysis module 102 extracts a tricolor coefficient of each pixel of the digital image to form a measurement array, as shown in FIG. 3B, and compares the measurement array with the reference array to find tricolor coefficient differences. The tricolor coefficient differences between the reference array shown in FIG. 3A and the measurement array shown in FIG. 3B are the tricolor coefficients having bold borderlines. The tricolor coefficient analysis module 102 further counts the tricolor coefficient differences, compares the count of the tricolor coefficient differences with a preset first acceptable value to determine image fidelity. In the example above, the count of the tricolor coefficient differences between the reference array shown in FIG. 3A and the measurement array shown in FIG. 3B is 4.

The edge analysis module 103 extracts an edge of the digital image, processes the edge of the digital image using binarization to obtain measurement binary values, as shown in FIG. 4B, compares the measurement binary values with the reference binary values to find binary values differences. The binary values differences between the reference binary values shown in FIG. 4A and the measurement binary values shown in FIG. 4B are the binary values having bold borderlines. The edge analysis module 103 further counts the binary values differences, compares the count of the binary values differences with a preset second acceptable value to further determine image fidelity of the digital image.

The quality determination module 104 determines that the digital camera module 2 quality is good if the count of the tricolor coefficient differences is less than or equal to the preset first acceptable value and if the count of the binary values differences is less than or equal to the preset second acceptable value, otherwise determines the digital camera module 2 quality is bad if the count of the tricolor coefficient differences is more than the preset first acceptable value and/or if the count of the binary values differences is more than the preset second acceptable value.

The test result generation module 105 generates a test report showing a test result of the digital camera module 2, as shown in FIG. 5, and stores the test report to the storage unit 20, or displays the test report on a display screen of the computer 1.

Figure 2:
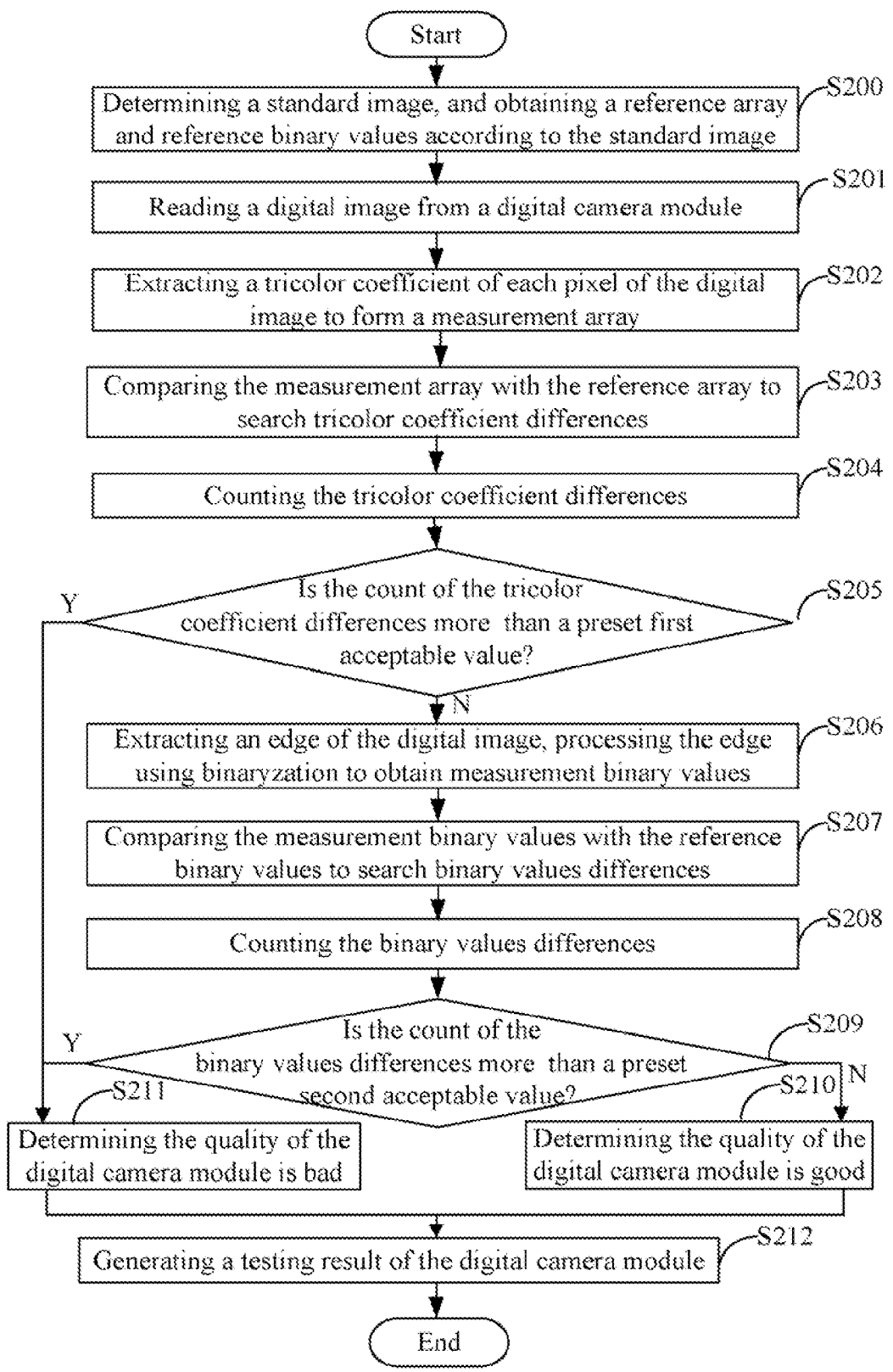
FIG. 2 is a flowchart of one embodiment of a method for testing a digital camera module.

FIG. 2 is a flowchart of one embodiment of a method for testing the digital camera module 2. The method can be performed by execution of computer readable program code by at least one processor of at least one computer system. Depending on the embodiment, additional blocks in the flow of FIG. 2 may be added, others removed, and the ordering of the blocks may be changed.

In block S200, the reference data generation module 100 determines a standard image from the storage unit 20, extracts a tricolor coefficient of each pixel of the standard image to form a reference array, extracts an edge of the standard image, and processes the edge using binarization to obtain reference binary values. In the present embodiment, the standard image is an image of a preset scene captured by a high quality camera module at fixed conditions. The fixed conditions include a distance between the high quality camera module and the scene, angles between the high quality camera module and the scene, and lighting conditions, for example.

In block S201, the data read module 101 reads a digital image from the digital camera module 2. In the present embodiment, the digital image is of the same scene as the standard image, and is captured by the digital camera module 2 at the same fixed conditions.

In block S202, the tricolor coefficient analysis module 102 extracts a tricolor coefficient of each pixel of the digital image to form a measurement array, as shown in FIG. 3B.

In block S203, the tricolor coefficient analysis module 102 compares the measurement array with the reference array to find tricolor coefficient differences.

In block S204, the tricolor coefficient analysis module 102 counts the tricolor coefficient differences.

In block S205, the tricolor coefficient analysis module 102 compares if the count of the tricolor coefficient differences is more than a preset first acceptable value. Block S211 is implemented if the count of the tricolor coefficient differences is more than the preset first acceptable value. Block S206 is implemented if the count of the tricolor coefficient differences is less than or equal to the preset first acceptable value.

In block S206, the edge analysis module 103 extracts an edge of the digital image, processes the edge of the digital image using binarization to obtain measurement binary values, as shown in FIG. 4B.

In block S207, the edge analysis module 103 compares the measurement binary values with the reference binary values to find binary values differences.

In block S208, the edge analysis module 103 counts the binary values differences.

In block S209, the edge analysis module 103 compares if the count of the binary values differences is more than a preset second acceptable value. Block S211 is implemented if the count of the binary values differences is more than the preset second acceptable value. Block S210 is implemented if the count of the binary values differences is less than or equal to the preset second acceptable value.

In block S210, the quality determination module 104 determines the digital camera module 2 quality is good.

In block S211, the quality determination module 104 determines the digital camera module 2 quality is bad.

In block S212, the test result generation module 105 generates a test report showing a test result of the digital camera module 2, as shown in FIG. 5, and displays the test report on a display screen of the computer 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for testing a digital camera module, the method comprising:

selecting a standard image from a storage unit, and extracting a tricolor coefficient of each pixel of the standard image to form a reference array;

extracting an edge of the standard image, and processing the edge of the standard image using binarization to obtain reference binary values;

reading a digital image from the digital camera module, and extracting a tricolor coefficient of each pixel of the digital image to form a measurement array;

extracting an edge of the digital image, and processing the edge of the digital image using binarization to obtain measurement binary values;

comparing the measurement array with the reference array to find tricolor coefficient differences, and comparing the measurement binary values with the reference binary values to find binary values differences;

comparing a count of the tricolor coefficient differences with a first acceptable value, and comparing a count of the binary values differences with a second acceptable value;

determining quality of the digital camera module according to the comparison results, comprising:

determining that the digital camera module has a good quality upon condition that the count of the tricolor coefficient differences is less than or equal to the first acceptable value and the count of the binary values differences is less than or equal to the second acceptable value; or determining that the digital camera module has a bad quality upon condition that the count of the tricolor coefficient differences is more than the first acceptable value and/or the count of the binary values differences is more than the second acceptable value; and generating a test report showing a test result of the digital camera module according to the determination, and displaying the test report on a display screen.

2. The method as described in claim 1, wherein the standard image is an image of a preset scene captured by a high quality camera module at fixed conditions.

3. The method as described in claim 2, wherein the digital image is of the same scene with the standard image, and is captured by the digital camera module at the same fixed conditions.

4. The method as described in claim 2, wherein the fixed conditions comprise a distance between the high quality camera module and the scene, angles between the high quality camera module and the scene, and lighting conditions.

5. A non-transitory storage medium having stored thereon instructions that, when executed by at least one processor of a computing device, cause the computing device to perform a method for testing a digital camera module, the method comprising:
   selecting a standard image, and extracting a tricolor coefficient of each pixel of the standard image to form a reference array;
   extracting an edge of the standard image, and processing the edge of the standard image using binarization to obtain reference binary values;
   reading a digital image from the digital camera module, and extracting a tricolor coefficient of each pixel of the digital image to form a measurement array;
   extracting an edge of the digital image, and processing the edge of the digital image using binarization to obtain measurement binary values;
   comparing the measurement array with the reference array to find tricolor coefficient differences, and comparing the measurement binary values with the reference binary values to find binary values differences;
   comparing a count of the tricolor coefficient differences with a first acceptable value, and comparing a count of the binary values differences with a second acceptable value;
   determining a quality of the digital camera module according to the comparison results, comprising:
      determining that the digital camera module has a good quality upon condition that the count of the tricolor coefficient differences is less than or equal to the first acceptable value and the count of the binary values differences is less than or equal to the second acceptable value; or
      determining that the digital camera module has a bad quality upon condition that the count of the tricolor coefficient differences is more than the first acceptable value and/or the count of the binary values differences is more than the second acceptable value; and
   generating a test report showing a test result of the digital camera module according to the determination, and displaying the test report on a display screen.

6. The storage medium as described in claim 5, wherein the standard image is an image of a preset scene captured by a high quality camera module at fixed conditions.

7. The storage medium as described in claim 5, wherein the digital image is of the same scene with the standard image, and is captured by the digital camera module at the same fixed conditions.

8. The storage medium as described in claim 6, wherein the fixed conditions comprise a distance between the high quality camera module and the scene, angles between the high quality camera module and the scene, and lighting conditions.

9. A system for testing a digital camera module, the system comprising:
   a data read module operable to read a digital image from the digital camera module;
   a tricolor coefficient analysis module operable to extract a tricolor coefficient of each pixel of the digital image to form a measurement array, compare the measurement array with a reference array to find tricolor coefficient differences, count the tricolor coefficient differences, and compare the count of the tricolor coefficient differences with a preset first acceptable value;
   an edge analysis module operable to extract an edge of the digital image, process the edge of the digital image using binarization to obtain measurement binary values, compare the measurement binary values with reference binary values to find binary values differences, count of the binary values differences, compare the count of the binary values differences with a preset second acceptable value;
   a quality determination module operable to determine that the digital camera module has a good quality upon condition that the count of the tricolor coefficient differences is less than or equal to the preset first acceptable value and the count of the binary values differences is less than or equal to the preset second acceptable, or determine that the digital camera module has a bad quality upon condition that the count of the tricolor coefficient differences is more than the preset first acceptable value and/or the count of the binary values differences is more than the preset second acceptable value; and
   a processor that executes the data read module, the tricolor coefficient analysis module, the edge analysis module, and the quality determination module.

10. The system as described in claim 9, further comprising:
   a reference data generation module operable to select a standard image from a storage unit, extract a tricolor coefficient of each pixel of the standard image to form the reference array, and extract an edge of the standard image, and processing the edge of the standard image using binarization to obtain the reference binary values.

11. The system as described in claim 10, wherein the standard image is an image of a preset scene captured by a high quality camera module at fixed conditions.

12. The system as described in claim 11, wherein the digital image is an image of the same preset scene, and is captured by the digital camera module under test at the same fixed conditions.

13. The system as described in claim 11, wherein the fixed conditions comprise a distance between the high quality camera module and the scene, angles between the high quality camera module and the scene/object, and lighting conditions.

14. The system as described in claim 9, further comprising:
   a test result generation module operable to generate a test report showing a test result of the digital camera module, and store the test report in a storage unit.

* * * * *